United States Patent
Smavatkul et al.

(10) Patent No.: US 7,590,079 B2
(45) Date of Patent: *Sep. 15, 2009

(54) METHOD OF COMMUNICATION DEVICE INITIATED FRAME EXCHANGE

(75) Inventors: Nattavut Smavatkul, Elk Grove Village, IL (US); Ye Chen, Schaumburg, IL (US); Stephen P. Emeott, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 694 days.

This patent is subject to a terminal disclaimer.

(21) Appl. No.: 10/677,909

(22) Filed: Oct. 2, 2003

(65) Prior Publication Data

US 2004/0081133 A1 Apr. 29, 2004

Related U.S. Application Data

(60) Provisional application No. 60/421,490, filed on Oct. 25, 2002.

(51) Int. Cl.
*G08C 17/00* (2006.01)
*H04J 3/16* (2006.01)
*H04L 12/42* (2006.01)

(52) U.S. Cl. ................. 370/311; 370/346; 370/449

(58) Field of Classification Search ............ 370/311, 370/328, 329, 338, 346, 449; 455/574, 450, 455/343.1, 343.2, 343.3, 343.4
See application file for complete search history.

(56) References Cited

U.S. PATENT DOCUMENTS

| | | | |
|---|---|---|---|
| 5,694,391 A | 12/1997 | Diachina et al. | |
| 5,701,298 A | 12/1997 | Diachina et al. | |
| 5,991,287 A | 11/1999 | Diepstraten et al. | |
| 6,067,297 A * | 5/2000 | Beach | 370/389 |
| 6,259,898 B1* | 7/2001 | Lewis | 455/103 |
| 6,356,759 B1 | 3/2002 | Mustajarvi | |
| 6,363,267 B1* | 3/2002 | Lindskog et al. | 455/574 |
| 6,463,307 B1* | 10/2002 | Larsson et al. | 455/574 |
| 6,507,601 B2 | 1/2003 | Parsa et al. | |
| 6,707,867 B2* | 3/2004 | Diepstraten et al. | 375/354 |
| 6,917,598 B1* | 7/2005 | Emeott et al. | 370/311 |
| 6,973,052 B2* | 12/2005 | Wang et al. | 370/278 |
| 7,133,381 B2* | 11/2006 | Sherman | 370/329 |
| 2003/0099221 A1* | 5/2003 | Rhee | 370/338 |
| 2004/0072588 A1* | 4/2004 | Beach et al. | 455/550.1 |
| 2007/0054632 A1* | 3/2007 | Lu et al. | 455/101 |

FOREIGN PATENT DOCUMENTS

JP    2002204234 A    7/2002

OTHER PUBLICATIONS

EPC—Supplementary European Search Report for Application No. 03809632.7, Dated Feb. 12, 2009—3 Pages.

(Continued)

*Primary Examiner*—Nguyen Vo
(74) *Attorney, Agent, or Firm*—Larry G. Brown (57) ABSTRACT

A method for accessing a wireless local area network (WLAN) channel and providing quality of service (QoS) for voice in a system supporting both voice and data services. Under the method, a communication device (302, 303) contends for a medium (channel). Upon identifying a transmit opportunity, the device transmits a voice packet to an access point (AP) (304) and polls the AP for downlink traffic. A low power implementation is feasible because the communication device can sleep, wake up to contend for the medium, transmit a voice packet to the AP, request a voice packet from the AP, transmit an acknowledgement, and go back to sleep.

14 Claims, 8 Drawing Sheets

OTHER PUBLICATIONS

"IEEE Standard Part 11: Wireless LAN Mediaum Access Control (MAC) and Physical Layer (PHY) Specification. (ISO/IEC 8802-11, ANSI/IEEE STD 802.11-1999) Chapter 9: MAC Sublayer Funtional Description" ISO/IEC 8802-11 ANSI/IEEE STD 802.11, XX, XX, Aug. 20, 1999, pp. 70-97, XP002207974—Sections 9.2.1-9.2.4, Sections 9.2.5.1-9.2.5.7, Section 9.3.

* cited by examiner

METHOD OF COMMUNICATION DEVICE INITIATED FRAME EXCHANGE

REFERENCE(S) TO RELATED APPLICATION(S)

The present application claims priority from provisional application Ser. No. 60/421,490, entitled "METHOD OF COMMUNICATION DEVICE INITIATED FRAME EXCHANGE," filed Oct. 25, 2002, which is commonly owned and incorporated herein by reference in its entirety.

FIELD OF THE INVENTION

The invention relates generally to the field of communications, and more particularly to a method of transmitting traffic between an access point and a plurality of portable devices.

BACKGROUND OF THE INVENTION

Generally, wireless local area networking (WLAN) devices must support two channel access methods, namely, contention-based access and polling driven access. Contention based access allows any wireless terminal or access point to capture the channel and transmit a data frame after monitoring the channel in accordance with carrier sensing procedures. When using the polling driven access procedure, on the other hand, all frame exchanges are initiated by an access point, either through a polling signal or by simply transmitting data from the access point to one of a plurality of stations. Either contention based or polling driven access techniques may be used to transport voice traffic between an access point and a plurality of wireless terminals, and extensions to both techniques are available to provide service differentiation between voice and data traffic classes sharing a single WLAN channel. However, the frame exchange sequences defined by both procedures are inefficient when used to deliver voice traffic between an access point and a plurality of stations. Additionally, neither technique offers adequate support for power savings operations in a wireless terminal that is transmitting and receiving voice traffic.

ANSI/IEEE Standard 802.11, 1999 Edition (hereinafter "the 802.11 standard"), defines two different methods of accessing the channel. Section 9.3 of the 802.11 standard defines a polling-based contention-free access method. Section 9.2 of the 802.11 standard defines a carrier sensing contention-based access method. Both types of access methods are described herein.

Figure 1:
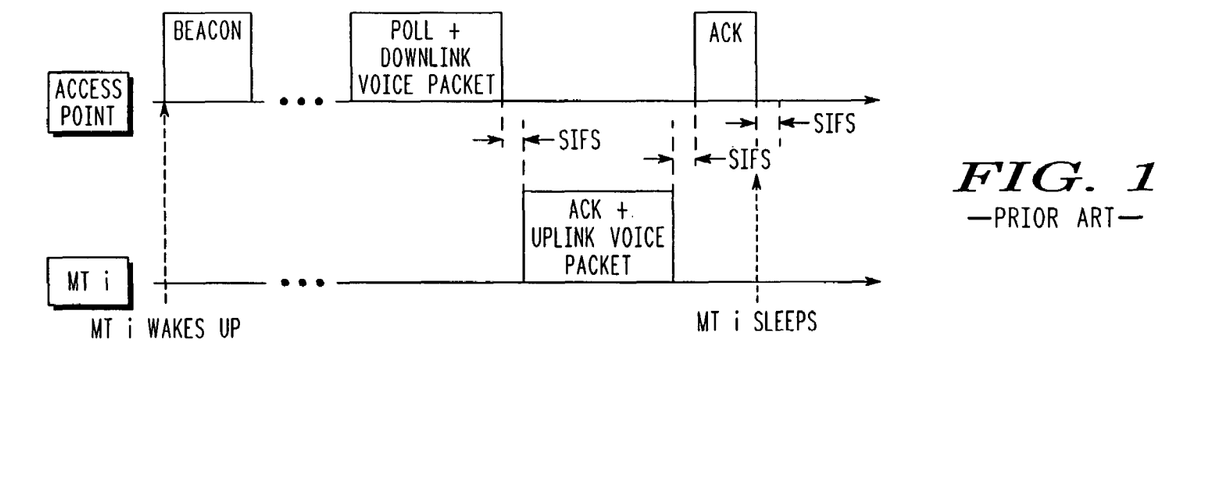
FIG. 1 is a diagram of a prior art WLAN frame exchange sequence using the contention-free access method.

The WLAN frame exchange sequence using the contention-free access method is illustrated in FIG. 1. Under this method, a communication device such as a mobile terminal (MT), wakes up prior to each beacon transmission and waits to be polled by the access point (AP). The duration between transmission of the beacon and receipt of a polling message at a particular MT can depend on the loading level of the network as well as the scheduling algorithm at the AP. Along with the polling message, the AP also transmits a downlink voice packet. Then, the MT responds with an acknowledgement (ACK) to the downlink voice packet and an uplink voice packet destined to the AP. Upon successful reception of the ACK and uplink voice packet, the AP acknowledges the successful reception by sending an acknowledgement message to the MT. Following a successful frame exchange sequence, the MT can stop monitoring the channel and turn off its radio transceiver. It should wake up again to receive the next beacon transmission. Because the frame exchange sequence depicted in FIG. 1 has to be initiated by the AP, the MT has to be alert at all times waiting for the initiation. This causes a power drain on the MT's battery, which on average, is proportional to the number of MTs on the polling list for a particular AP.

Figure 2:
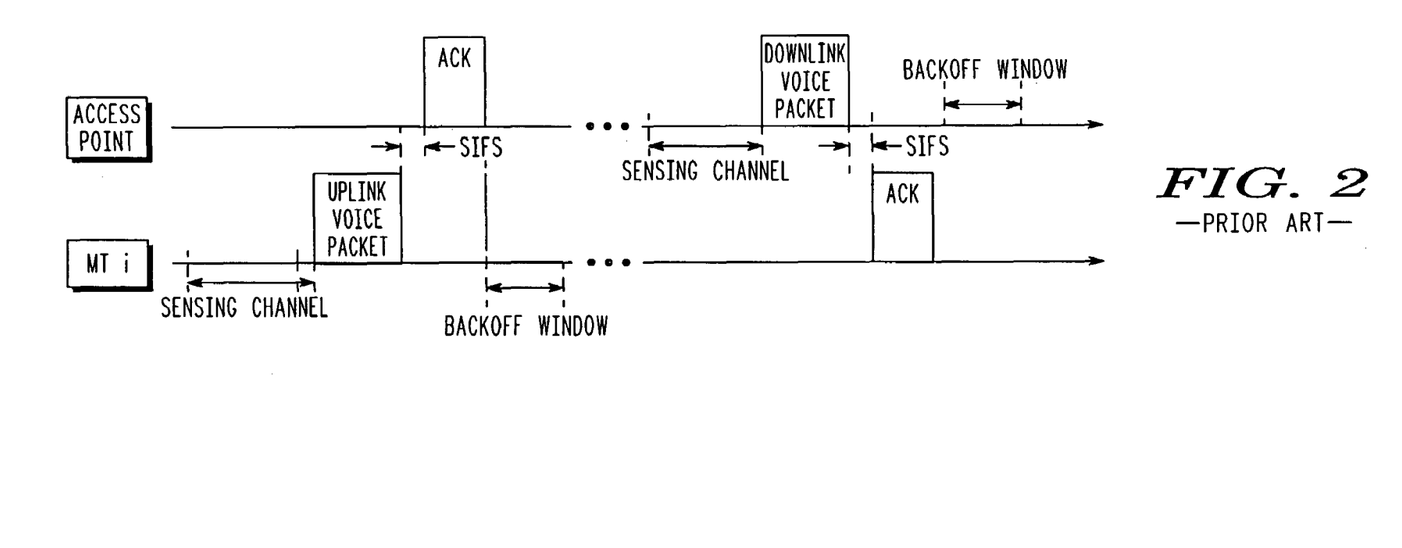
FIG. 2 is a diagram of a prior art WLAN frame exchange sequence using a contention-based access method.

The WLAN frame exchange sequence using a contention-based access method is illustrated in FIG. 2. Under this method, the MT starts contending for the channel in accordance with carrier sensing procedures defined in Section 9.2.1 of the 802.11 standard and random backoff time procedures defined in Section 9.2.4 of the 802.11 standard upon receiving a voice packet from the higher layer protocol. After winning the contention process and acquiring the channel, the MT transmits an uplink voice packet to the AP. After a small window of time has expired, represented by short interframe space (SIFS), the AP acknowledges receipt of the uplink voice packet by transmitting an ACK to the MT. Independently, in the downlink direction, the AP also starts contending for the channel upon receiving a voice packet from its network interface. Similarly, the AP transmits a downlink voice packet to the MT upon winning the contention. The frame exchange sequence is terminated when the MT responds with an acknowledgement message. Following the completion of either an uplink or downlink voice frame exchange, the transmitting station (e.g., AP or MT) invokes the random backoff procedure defined in Section 9.2.4 of the 802.11 standard prior to transmitting another voice frame. Because the downlink traffic flow is independent from the uplink traffic flow, the timing of downlink transmission is dependent only on the AP and the fixed network. Because the MT has no control over this timing, it has to remain alert at all times waiting for the downlink transmission, thereby causing a drain on the MT's battery. In addition, it is inefficient to allow the AP and MT to operate independently, which can result in additional contention between downlink and uplink traffic transmissions.

Thus, there is a need for an improved frame exchange sequence to address the drawbacks of the prior art.

DETAILED DESCRIPTION OF THE PREFERRED EMBODIMENTS

A first aspect of the first embodiment of the present invention provides a method of communication device initiated frame exchange every service interval comprising transmitting a polling message to an access point at least once per service interval, the polling message requesting a downlink traffic frame; and determining whether a valid downlink frame is received from the access point. Another aspect of the first embodiment of the invention provides a method of communication device initiated frame exchange comprising receiving a polling message from a communication device, the polling message requesting transmission of a downlink traffic frame; and responding to the polling message by transmitting a downlink traffic frame to the communication device. A second embodiment of the present invention provides a method of communication device initiated frame exchange comprising activating a transceiver of the communication device; initiating transmission of an uplink traffic frame to an access point; determining whether a valid response frame is received; and when a valid response frame is received, deactivating the transceiver.

The present invention is an improved technique for accessing a WLAN channel, and providing quality of service (QoS) for voice in a system supporting both voice and data services. Under this technique, a MT contends for a medium (channel). Upon winning the contention and obtaining access to the medium, the MT transmits a voice packet to the AP and polls the AP for waiting traffic. A low power implementation is feasible because the MT can sleep, wake up to contend for the medium, transmit a voice packet to the AP, request a voice packet from the AP, transmit an acknowledgement, and go back to sleep. Although the first and second embodiments are described with reference to a MT, the invention can be used with any communication device capable of communicating with an AP.

Current generation WLANs were designed and optimized for best effort data services. Recently, there has been a growing need to offer an efficient mode of transport for isochronous traffic over WLAN. The isochronous traffic refers to a connection-oriented service that requires the periodic availability of channel bandwidth to achieve the desired QoS, such as telephony voice and video conferencing. Although the described embodiments of the present invention focus on the periodic communication of packetized voice from a MT to the AP and from the AP to the MT, it can be applied to any type of bi-directional traffic over a contention-based access network.

Figure 3:
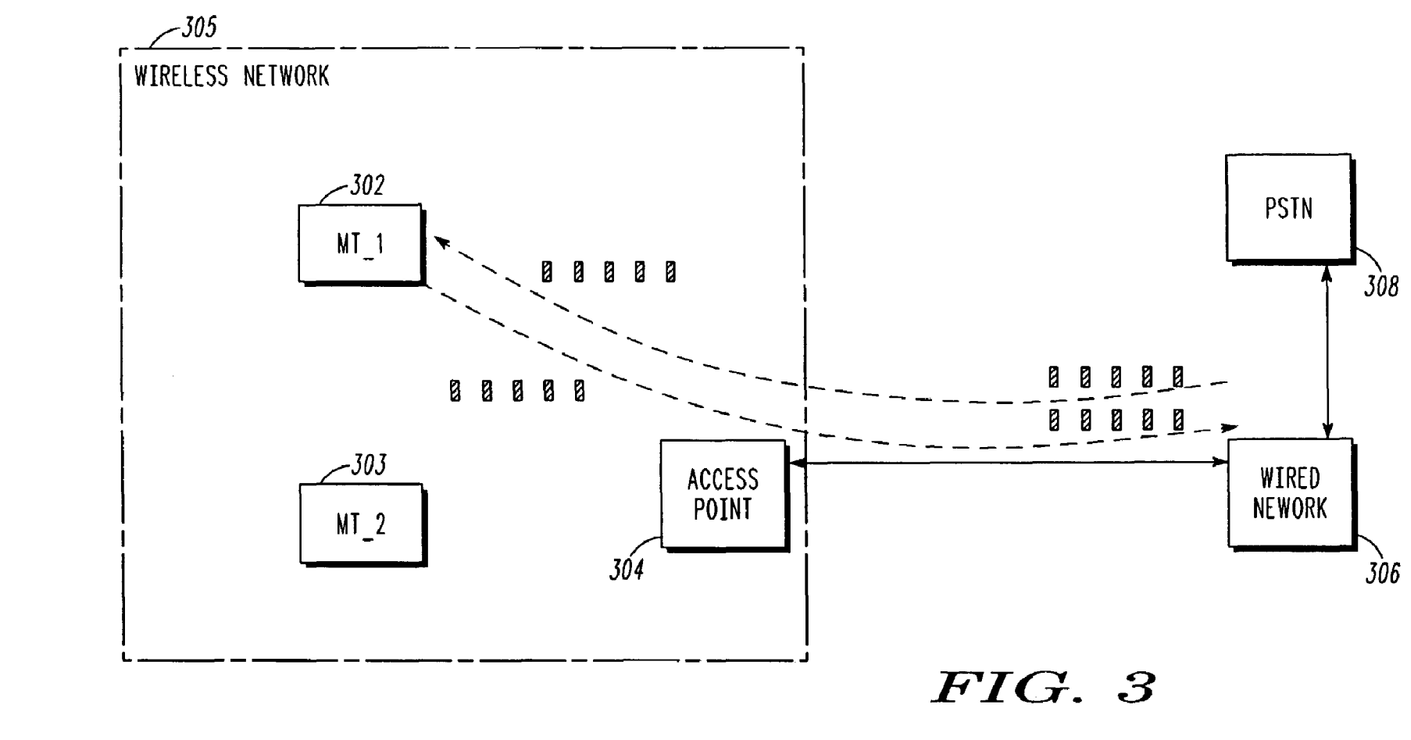
FIG. 3 is a block diagram of a system that can be used to implement the communication device initiated frame exchange method of the present invention.

FIG. 3 is a block diagram of a system that can be used to implement the communication device initiated frame exchange method of the present invention. To support telephony voice over WLAN, the AP 304 must be able to exchange voice frames with a plurality of MTs 302, 303, as shown in FIG. 3. The voice frames generated by a MT 302, 303 and destined to the AP 304 are referred to herein as uplink traffic. Additionally, the voice frames arriving from the network 306 (based on voice traffic from a public switched telephone network (PSTN) 308, for example) and destined to the MT 302, 303 are referred to herein as downlink traffic. Under the present invention, the MT 302, 303 associates itself with a nearby AP 304, and exchanges voice frames with the AP 304.

In the present invention, the inter-arrival time between voice packets is related to a service interval. In particular, a service interval is defined as the average inter-arrival time between voice frames comprising either uplink or downlink traffic. Generally, a wireless station 302, 303 or a voice gateway in the network 306 generates one voice frame per service interval, just prior to an expected packet arrival time. The expected packet arrival time for voice frame N+1 is the expected packet arrival time for voice frame N plus the length of the service interval. While the actual arrival time of packets can vary, due to variable processing loads or network delays, the service interval remains constant, and is based on the frame interval of the voice coder utilized at each side of the wireless call. The expected arrival time, however, is generally unique for each of a plurality of MTs.

Figure 4:
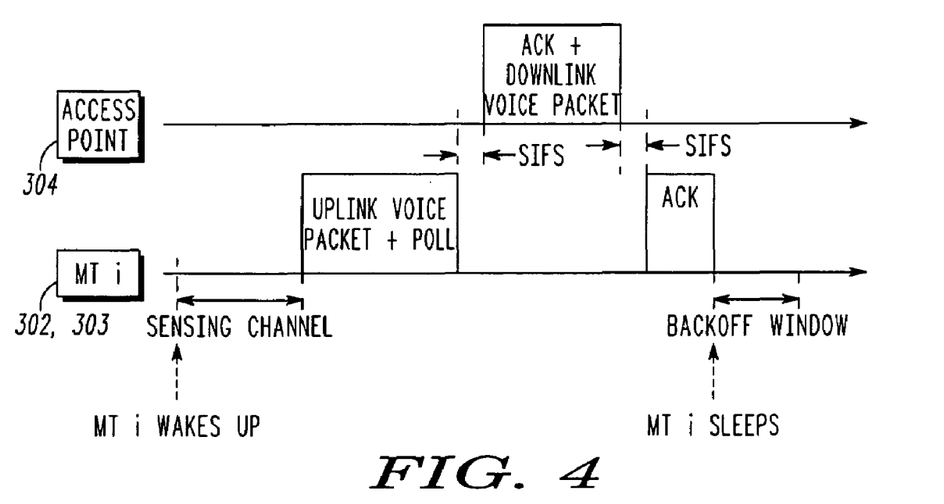
FIG. 4 is a diagram of a method of communication device initiated frame exchange in accordance with a first embodiment of the present invention.

Referring now to FIG. 4, a frame exchange sequence in accordance with a first embodiment of the present invention is shown. Upon receiving packetized voice traffic from a higher layer voice application, the MT 302, 303 wakes up its transceiver and starts contending for the channel access. After winning the contention process and acquiring the channel, the MT 302, 303 transmits an uplink voice packet to the AP 304. In the same step, the MT 302, 303 also transmits a polling message to the AP 304, requesting the AP 304 to transmit a downlink voice packet. The AP 304 responds with an acknowledgement to the uplink voice packet and sends a downlink voice packet to the requesting MT 302, 303. Upon successful reception of the downlink voice packet, the MT 302, 303 may acknowledge receipt of the packet by transmitting an acknowledgement message to the AP 304. Finally, the MT 302, 303 can turn off its radio transceiver module and go to sleep until the next voice packet is available or until it is time to poll the AP 304 for downlink traffic.

The present invention includes a means of polling the AP 304 even when a voice packet is not generated by a higher layer voice application at an expected packet arrival time. For example, both the MT 302, 303 and a voice gateway in the network 306 may utilize silence suppression to reduce the amount of uplink and downlink traffic during a voice call. When silence suppression is employed, the MT 302, 303, for example, stops generating packets at the end of each talk spurt, and begins generating packets again at the start of a new talk spurt. During silence periods, when the MT 302, 303 is not generating voice packets, the uplink traffic pattern changes because there is no voice packet at the expected packet arrival time to trigger an uplink transmission. In this case, the present invention utilizes a polling window in the MT 302, 303 to detect the passing of a service interval, after which the MT 302, 303 wakes up its transceiver and starts contending for the channel access to send a poll-only message to AP 304 for retrieving downlink traffic.

Figure 5:
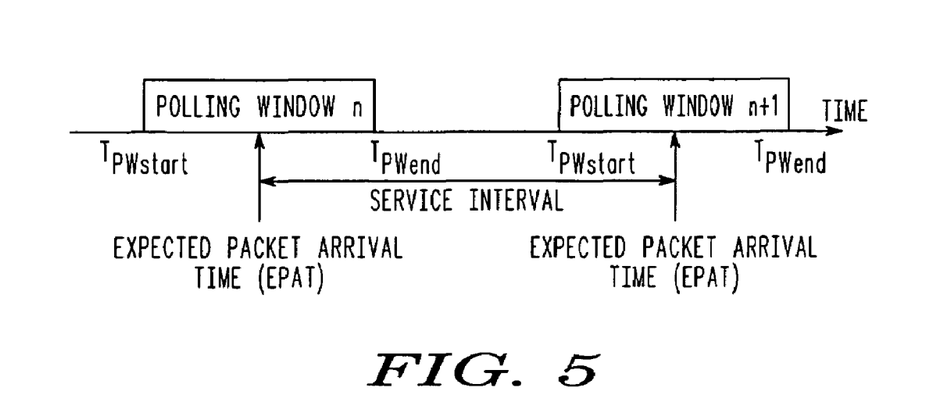
FIG. 5 is a diagram showing the relationship between a service interval and a polling window in accordance with the embodiments of the method of the present invention.

In addition, the present invention uses the polling window to determine when a MT 302, 303 may contend for the WLAN channel. A polling window is a short interval around the expected packet arrival time, with a start time of $T_{Pwstart}$ and an end time of $T_{Pwend}$, as shown in FIG. 5. If a voice packet is generated by a voice application before $T_{PWstart}$, a poll message with data carried by the packet is sent at $T_{PWstart}$. On the other hand, any voice packet received within a polling window is sent immediately with a poll. Finally, if no voice frame arrives for a given service interval, a poll-only message is sent to the AP 304 for retrieving downlink traffic at the end of the polling window $T_{Pwend}$.

The first and second embodiments of the invention will now be described in greater detail using the IEEE 802.11 WLAN as an example. The overall process of establishing a telephony voice call can be separated into four stages. The first stage occurs when the MT 302, 303 is first powered on and searching for an AP 304 to associate with. The second stage represents the event where there is an incoming call and the AP 304 needs to locate a MT 302, 303 to establish a voice conversation. This second stage is optional if the voice call is initiated by the MT 302, 303. The third stage is where the voice packet transfer takes place. Finally, the fourth stage disconnects the call. The present invention focuses on the second and third stages.

For a network-initiated voice call, the AP 304 needs to locate and communicate its desire to establish a voice connection with a MT 302, 303. This communication can take place in a periodic beacon, which occurs at a pre-determined interval. Because a MT 302, 303 is required to wake up periodically to listen to beacon messages, the AP 304 can indicate to the MT 302, 303 that there is an incoming voice call. To set up a voice call under the present invention, it is desirable to ensure that the voice frames of both uplink and downlink traffic flows are synchronized with each other, i.e., both the network 306 and the MT 302, 303 create voice packets at roughly the same instance and with a common service interval.

Figure 6:
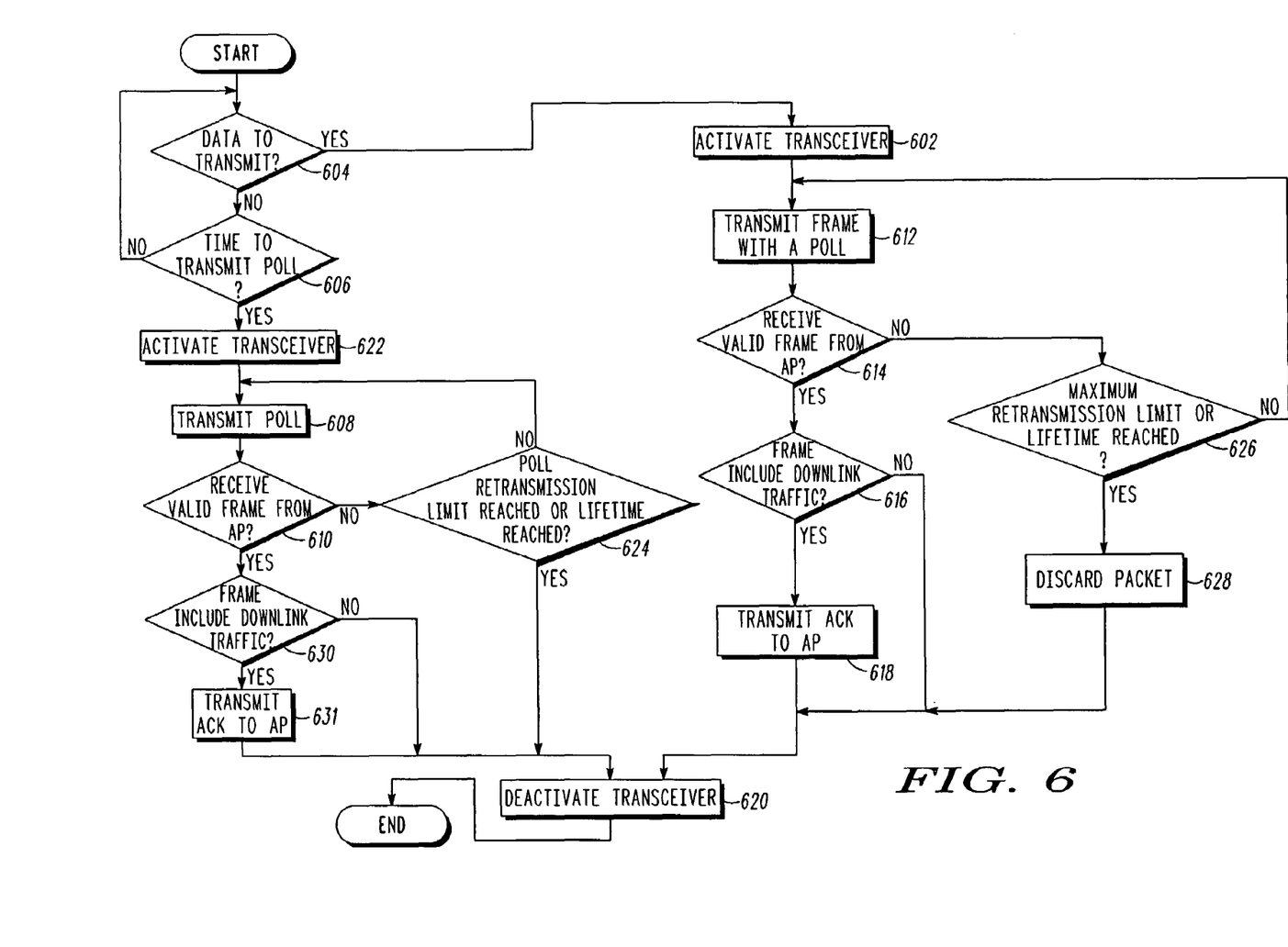
FIG. 6 is a flow diagram of the method of communication device initiated frame exchange of FIG. 4 from the perspective of the communication device.

A flow diagram of the frame exchange sequence of FIG. 4 from the MT perspective is shown in FIG. 6. The flow diagram is for illustrative purposes only and is not meant to be limiting. Upon receiving a voice packet from a voice application (step 604), the MT 302, 303 activates its transceiver (step 602) and starts contending for the channel access. For a contention-based medium access control (MAC) protocol, the duration between transceiver activation and winning contention typically depends on the loading level of the wireless network 305 (FIG. 3). Upon sensing the channel and winning the contention (i.e., identifying a transmit opportunity) the MT 302, 303 acquires the channel by transmitting the uplink packet that has recently arrived and, in the same step, polling the AP 304 for downlink traffic (step 612). This process of identifying a transmit opportunity is repeated whenever the MT 302, 303 needs to transmit data or a poll to the AP 304. Because both uplink and downlink packets should be available at the same instance, the AP 304 should receive this polling message $T_1$ seconds after the MT 302, 303 activates its transceiver, where $T_1$ consists of the time to ramp up the transceiver, contend for the channel, transmit the packet, propagate the packet, and process the reception. Consequently, the network 306 also has $T_1$ seconds to deliver a downlink packet to the AP 304, making it ready to be transmitted when the AP 304 receives the polling message. The uplink and downlink packet creation time can also be adjusted so that it reflects the relative network congestion level between the wired network 306 (FIG. 3) and wireless network 305.

At step 614, the MT 302, 303 determines whether it received a valid frame from the AP 304. If a valid frame was not received, the MT 302, 303 further checks that a maximum amount of retransmissions has not been reached and that a maximum lifetime of this packet has not been reached (step 626). If it passes both tests, the MT 302, 303 retransmits the data previously sent along with a polling message (step 612). On the other hand, the packet is discarded (step 628) and the MT 302, 303 deactivates its transceiver (step 620), if either test fails. Referring back to step 614, when a valid frame was received, the MT 302, 303 determines whether the frame includes downlink traffic (step 616). When the frame includes downlink traffic, the MT 302, 303 sends an acknowledgement of receipt of the frame (step 618) and deactivates its transceiver (step 620). When the frame does not include downlink traffic, the MT 302, 303 simply deactivates its transceiver (step 620) and the method ends.

Referring back to step 604, when the MT 302, 303 does not have data to transmit, it determines whether it is time to transmit a polling message to the AP 304 for downlink traffic (step 606). If the answer is yes, because the end of a polling window has been reached, the MT 302, 303 activates its transceiver (step 622) and transmits the polling message (step 608). Then, the MT 302, 303 waits to receive a response from the AP 304. As will be described in detail with reference to FIG. 7 later herein, when the AP 304 has a downlink packet ready to be transmitted, the AP 304 responds to the polling message from the MT 302, 303 by transmitting the packet. Additionally, it also responds to the uplink traffic packet by transmitting an acknowledgement message to the requesting MT 302, 303. At step 610, the MT 302, 303 determines whether a valid frame was received from the AP 304. If a valid frame was not received, the MT 302, 303 performs collision avoidance and back off procedures as known in the art, and prepares to retransmit a poll. The retransmission decision depends on two factors, whether or not a maximum amount of retransmissions has been reached and whether or not a maximum lifetime of this poll has been reached (step 624). If both tests are passed, the MT 302, 303 proceeds back to step 608 to retransmit the poll. On the other hand, the poll attempt is aborted and the MT 302, 303 deactivates its transceiver (step 620), if either test fails. Referring back to step 610, when a valid frame was received, the MT 302, 303 determines whether the frame includes downlink traffic (step 630). When the frame does not include downlink traffic, the MT 302, 303 deactivates its transceiver (step 620) and the method ends. When the frame includes downlink traffic, the MT 302, 303 sends an acknowledgement of receipt of the frame (step 631). Next, at step 520, the MT 302, 303 deactivates its transceiver and sleeps until time to transmit another polling message or until it receives traffic from a higher layer application to transmit to the AP 304. By controlling the timing of frame exchange with the AP 304, the MT 302, 303 is able to sleep during periods of inactivity, thereby increasing the MT's standby battery time.

Figure 7:
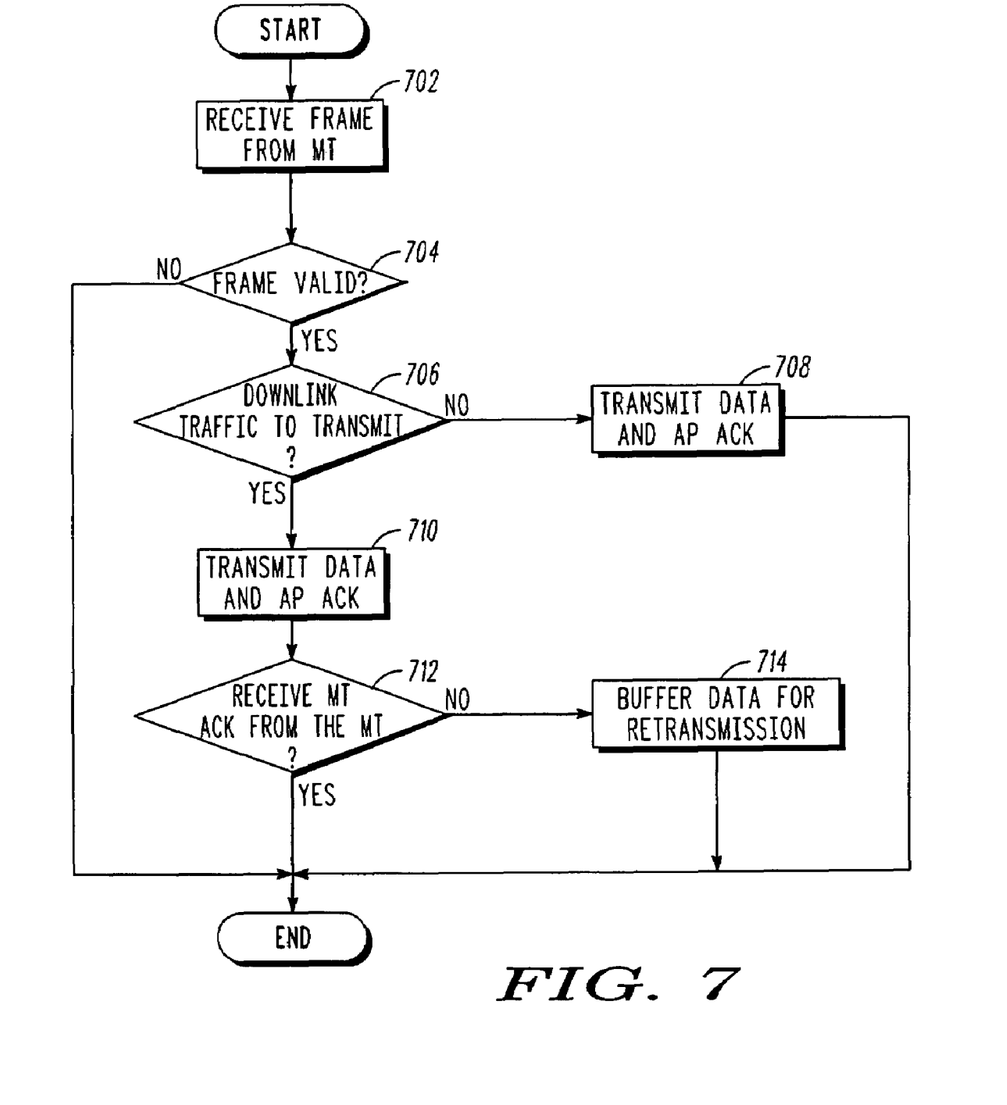
FIG. 7 is a flow diagram of the method of communication device initiated frame exchange of FIG. 4 from the perspective of the Access Point.

A flow diagram of the method of device initiated frame exchange of FIG. 4 from the AP perspective is shown in FIG. 7. For the AP 304, the method begins when the AP 304 receives a frame from the MT 302, 303 (step 702). Next, the AP 304 determines whether the frame is valid (step 703). When the frame is not valid, the method ends. When the frame is valid, the AP 304 determines whether it has downlink traffic destined for the MT 302, 303 (step 706). When the AP 304 does not have downlink traffic to transmit, it acknowledges receipt of the uplink frame by transmitting an acknowledgement to the MT 302, 303 (step 708), and the method ends. The uplink frame can either be poll-only frame (sent by step 608 of FIG. 6) or data with a poll frame (sent by step 612 of FIG. 6). When the AP 304 has downlink traffic to transmit, it transmits the downlink traffic along with an acknowledgement of receipt of the uplink frame to the MT 302, 303 (step 710), and waits for an acknowledgement of receipt of the downlink traffic packet from the MT 302, 303. At step 712, the AP 304 determines whether it received the acknowledgement. If the AP 304 has not received the acknowledgement (after an appropriate amount of time has passed), it buffers the data for retransmission the next time it receives a polling message from the MT 302, 303 (step 714), and the frame exchange sequence ends. The frame exchange sequence also ends if the AP 304 has received the acknowledgement.

Figure 8:
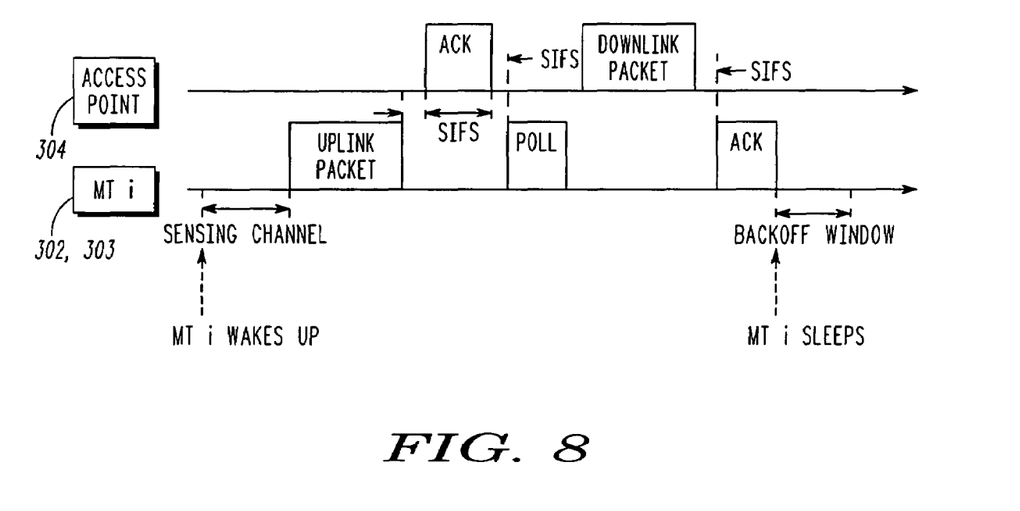
FIG. 8 is a diagram of a method of communication device initiated frame exchange in accordance with a second embodiment of the present invention.

A second embodiment of the method of the present invention is shown in FIG. 8. Similar to the frame exchange sequence of the first embodiment, upon receiving packetized traffic from a higher layer protocol, the MT 302, 303 activates its transceiver and starts contending for the channel access. Upon winning the contention, the MT 302, 303 acquires the channel (i.e., identifies a transmit opportunity)

by transmitting the uplink voice packet to the AP 304. Instead of sending a downlink voice packet with a piggybacked acknowledgement (as shown in FIG. 4), the AP 304 responds to the uplink voice packet by transmitting an acknowledgement message, which is compliant to the current 802.11 standard. Upon receiving the acknowledgement message from the AP 304, the MT 302, 303 polls the AP 304 for a downlink voice packet. The AP 304 then responds to the poll message with a downlink voice packet. Finally, the MT 302, 303 terminates the frame exchange sequence by sending an acknowledgement message to the AP 304, acknowledging reception of a valid downlink voice packet. After completion of the frame exchange sequence, the MT 302, 303 may turn off its radio transceiver module and go to sleep until the next packet is available for transmission. Compared to the frame exchange sequence shown in FIG. 4, the second embodiment loses some efficiency due to the sequential nature of the transmission of uplink and downlink packets.

Figure 9:
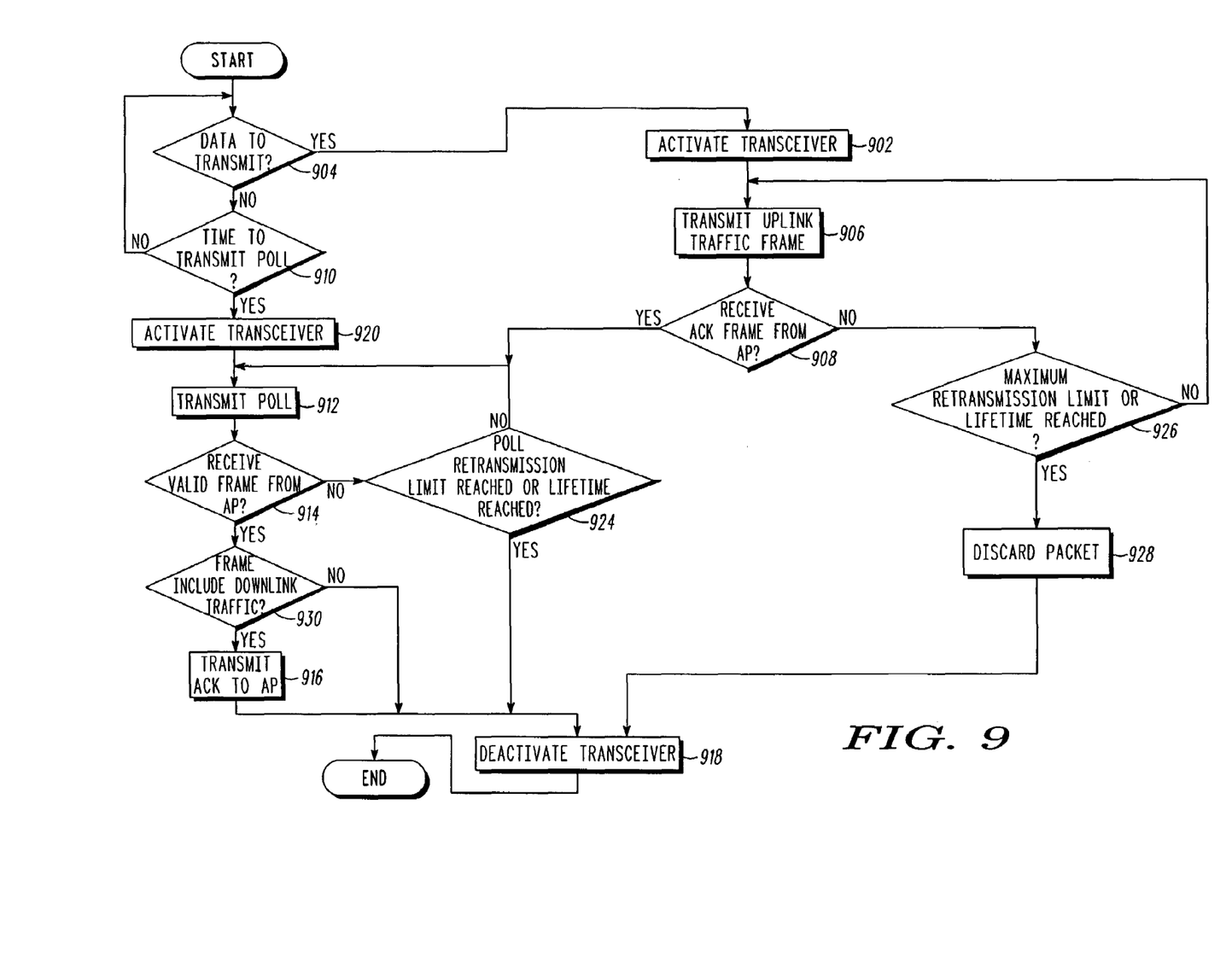
FIG. 9 is a flow diagram of the method of communication device initiated frame exchange of FIG. 8 from the perspective of the communication device.

A flow diagram of the method of device initiated frame exchange of FIG. 8 from the MT perspective is shown in FIG. 9. Upon receiving a voice packet from a higher-level application (step 904), the MT 302, 303 activates its transceiver (step 902) and starts contending for the channel access. For a contention-based medium access control (MAC) protocol, the duration between transceiver activation and winning contention typically depends on the loading level of the wireless network 305. Upon winning the contention, the MT 302, 303 acquires the channel by transmitting the uplink traffic frame (step 906) to the AP 304. If the MT 302, 303 does not receive an acknowledgement (step 908), it prepares to retransmit the data frame. The retransmission decision depends on two factors, whether or not a maximum amount of retransmissions has been reached and whether or not a maximum lifetime of this poll has been reached (step 926). If both tests are passed, the MT 302, 303 proceeds back to step 906 to retransmit this frame. On the other hand, the data frame will be discarded (step 928) and the MT 302, 303 will deactivate its transceiver (step 918), if either test fails. Referring back to step 908, when the MT 302, 303 receives an acknowledgement, it proceeds to poll the AP 304 for downlink traffic (step 912) and waits to receive a response from the AP 304. At step 914, the MT 302, 303 determines whether it received a valid frame from the AP 304. If an invalid frame is received, it prepares to re-poll the AP 304. The re-poll decision depends on two factors, whether or not a maximum amount of attempts has been reached and whether or not a maximum lifetime of this poll has been reached (step 924). If both tests are passed, the MT 302, 303 proceeds back to step 912 to retransmit this poll. On the other hand, the poll will be aborted and the MT 302, 303 will deactivate its transceiver (step 918), if either test fails. At step 914, when a valid frame is received from the AP 304, the MT 302, 303 further checks that the reception contains a down link traffic frame in step 930. If the frame contains downlink traffic, the MT 302, 303 transmits an acknowledgment of receipt of the frame to the AP 304 (step 916). At step 918, the MT 302, 303 deactivates its transceiver and sleeps until it has traffic or a poll to transmit. If the frame does not contain downlink traffic, the MT immediately deactivates its transceiver and sleeps until it has traffic or a poll to transmit (step 918).

Referring back to step 804, when the MT 302, 303 has no data to transmit, it determines whether it is time to transmit a periodic polling message to the AP 304 for downlink traffic (step 910). If the answer is yes, because the end of a polling window has been reached, the MT 302, 303 activates its transceiver (step 920) and the method proceeds as previously described at step 912. If the time to transmit poll has not yet arrived, the MT 302, 303 remains in "sleeps" mode until it has more data to transmit or until it is time to poll the AP 304 for downlink traffic.

Figure 10:
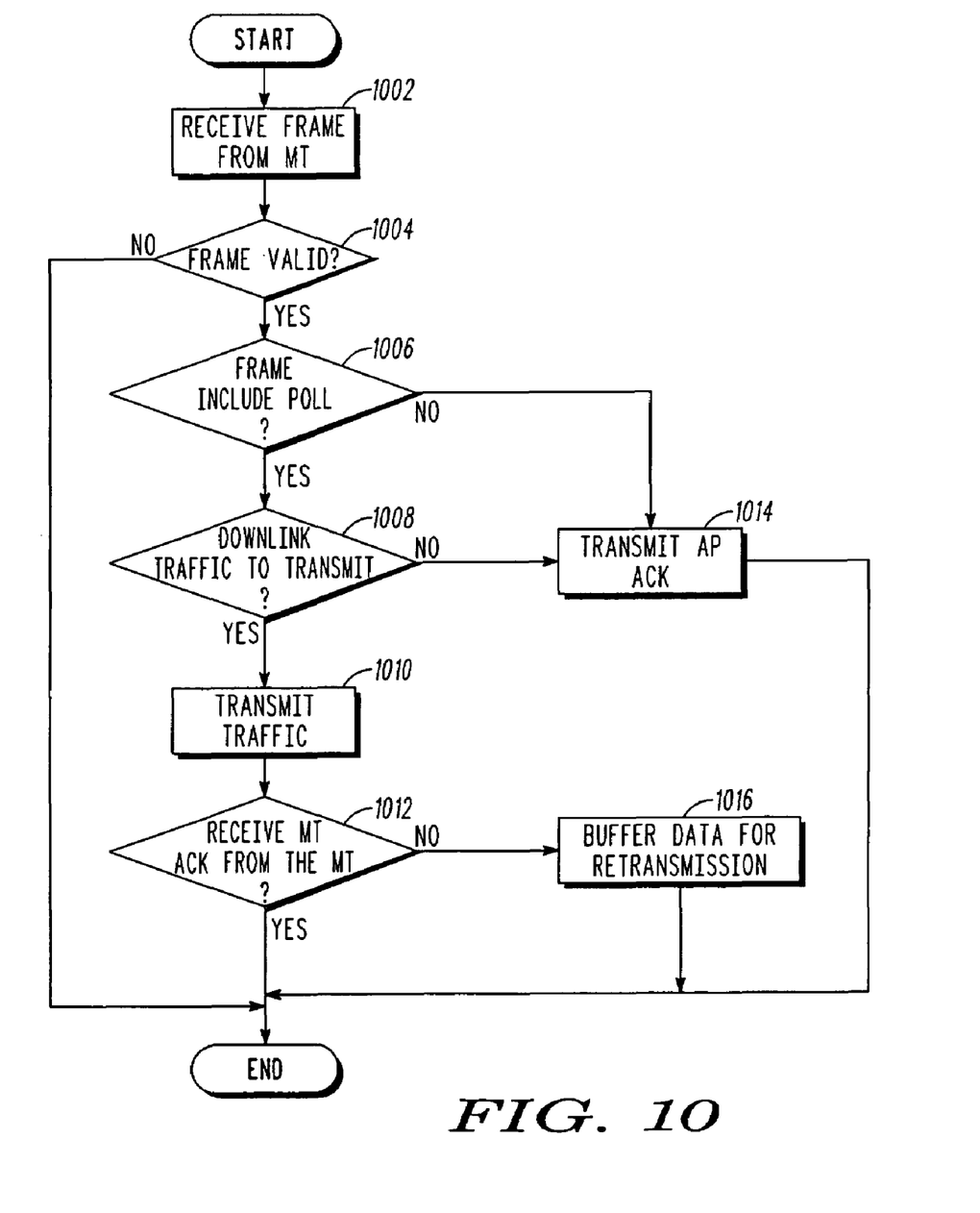
FIG. 10 is a flow diagram of the method of communication device initiated frame exchange of FIG. 8 from the perspective of the Access Point.

A flow diagram of the method of device initiated frame exchange of FIG. 8 from the AP perspective is shown in FIG. 10. For the AP 304, the method begins when the AP 304 receives a frame from the MT 302, 303 (step 1002). Next, the AP 304 determines whether the frame is valid (step 1004). When the frame is invalid, the method ends. When the frame is valid, the AP 304 determines whether the frame includes a poll for downlink traffic (step 1006). When the frame includes a poll for downlink traffic, the AP 304 determines whether it has traffic to send (step 1008). When there is no downlink traffic to transmit, the AP 304 transmits an acknowledgement of receipt of the poll frame to the MT (step 1014), and the method ends. When there is downlink traffic to send, the AP 304 transmits the traffic to the MT 302, 303 (step 1010) and waits for an acknowledgement of receipt of the downlink traffic from the MT 302, 303. At step 1012, the AP 304 determines whether it has received the acknowledgement. If the AP 304 has received the acknowledgement, the method ends. If the AP 304 has not received the acknowledgement (after an appropriate amount of time has passed), it buffers the data for retransmission the next time it receives a polling message from the MT 302, 303 (step 1016), and the frame exchange sequence ends. When the frame received at step 1002 includes uplink traffic ("no" path at step 1006), the AP 304 transmits an acknowledgement of receipt of the uplink traffic to the MT (step 1014), and the method ends.

The present invention enables a communication device to initiate a frame exchange sequence with an AP, instead of waiting for a poll or a voice frame from the AP as suggested by the prior art. Accordingly, the AP must be alert at all times waiting for the initiation. This is acceptable because the AP typically does not rely on battery power. As a result, the communication device is relieved from having to remain awake, thereby reducing its power consumption. Additionally, the present invention enables each device to wake up at regular service intervals, which are completely independent of the beacon interval of the AP and the service interval of other devices. This allows a mixture of stations with different types of isochronous traffic to occupy the channel without complicating the beacon timing, and allows the AP to transmit beacons at a much lower frequency than the service interval of traffic such as voice. Further, synchronization between uplink and downlink packet transfer results in higher efficiency and lower contention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the invention as defined by the following appended claims.

What is claimed is:

1. A method of communication device initiated frame exchange every service interval comprising:
   initiating frame exchange at the communication device by transmitting a polling message along with uplink traffic to an associated access point, the polling message requesting a downlink traffic frame; and
   determining whether a valid downlink frame is received from the access point.

2. The method of claim 1 wherein when a valid downlink frame is received, the method comprises transmitting an acknowledgement to the access point.

3. The method of claim 2 comprising:
  before transmitting the polling message, activating a transceiver of the communication device; and
  after transmitting an acknowledgement, deactivating the transceiver.

4. The method of claim 1 wherein when a valid downlink frame is not received, the method comprises:
  determining whether it is time to transmit another polling message; and
  deactivating the transceiver when it is not time to transmit another polling message.

5. The method of claim 1 wherein the step of transmitting the polling message along with uplink traffic to the access point comprises transmitting the polling message along with uplink traffic during a service interval.

6. The method of claim 1 wherein when a valid downlink frame is not received, the method comprises retransmitting the uplink traffic and the polling message.

7. The method of claim 1 wherein when a valid downlink frame is received, the method comprises:
  determining whether the frame contains traffic;
  when the frame contains traffic,
    transmitting an acknowledgement of receipt of the traffic to the AP; and
    deactivating a transceiver of the communication device; and
  when the frame does not contain traffic, deactivating a transceiver of the communication device.

8. The method according to claim 1, wherein the uplink traffic is transmitted in response to the receipt of the uplink traffic from a higher layer application.

9. A method of communication device initiated frame exchange comprising:
  activating a transceiver of the communication device;
  initiating frame exchange at the communication device by transmitting a polling message along with an uplink traffic frame to an associated access point;
  determining whether a valid response frame is received; and
  when a valid response frame is received, deactivating the transceiver.

10. The method of claim 9 wherein when a valid response frame is not received, the method comprises retransmitting the uplink traffic frame to the access point.

11. A method of communication device initiated frame exchange comprising:
  receiving a polling message and uplink traffic from a communication device that has initiated frame exchange, the polling message requesting transmission of a downlink traffic frame and wherein the polling message and uplink traffic are received at an access point associated with the communication device; and
  responding to the polling message by transmitting a downlink traffic frame to the communication device.

12. The method of claim 11 further comprising transmitting an acknowledgment of receipt of the uplink traffic to the communication device.

13. The method of claim 11 further comprising:
  waiting for an acknowledgement of receipt of the downlink traffic frame from the communication device;
  when the acknowledgement is not received, buffering the downlink traffic frame for retransmission to the communication device.

14. A method of communication device initiated frame exchange comprising:
  receiving a polling message and uplink traffic from a communication device that has initiated frame exchange and wherein the polling message and uplink traffic are received at an access point associated with the communication device, the polling message requesting transmission of a downlink traffic frame; and
  responding to the polling message by transmitting a downlink traffic frame to the communication device, wherein the downlink traffic frame includes downlink traffic destined for the communication device and an acknowledgement of receipt of the polling message.

* * * * *